(12) United States Patent
Rossi

(10) Patent No.: US 7,708,490 B2
(45) Date of Patent: May 4, 2010

(54) CLAMP

(75) Inventor: Trevor J. Rossi, Lasalle (CA)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/260,569

(22) Filed: Oct. 29, 2008

(65) Prior Publication Data

US 2009/0106949 A1   Apr. 30, 2009

Related U.S. Application Data

(60) Provisional application No. 60/983,277, filed on Oct. 29, 2007.

(51) Int. Cl.
  *F16B 7/10* (2006.01)
  *F16B 7/04* (2006.01)

(52) U.S. Cl. .............. 403/293; 403/109.8; 403/290; 285/420; 24/279

(58) Field of Classification Search .......... 403/289, 403/290, 293, 109.8; 285/252, 253, 420; 24/278, 279
See application file for complete search history.

(56) References Cited

U.S. PATENT DOCUMENTS

| | | | | |
|---|---|---|---|---|
| 709,779 A | * | 9/1902 | Kidd et al. ............... | 285/114 |
| 909,131 A | * | 1/1909 | Antic ..................... | 285/148.14 |
| 1,038,012 A | * | 9/1912 | Sobey .................... | 285/253 |
| 1,765,221 A | * | 6/1930 | Falla ..................... | 285/253 |
| 2,573,203 A | * | 10/1951 | Kinney .................... | 285/5 |
| 2,664,303 A | * | 12/1953 | Mansfield ................. | 285/319 |
| 3,389,442 A | * | 6/1968 | Tetzlaff .................. | 24/278 |
| 3,477,106 A | * | 11/1969 | Tetzlaff et al. ........... | 24/279 |
| 3,479,069 A | * | 11/1969 | Sedam .................... | 285/364 |
| 4,361,024 A | * | 11/1982 | Haldric ................... | 72/324 |
| 4,372,017 A | * | 2/1983 | Heckethorn ................ | 24/277 |
| 4,660,862 A | * | 4/1987 | Cassel et al. ............. | 285/114 |
| 4,753,462 A | * | 6/1988 | Liu ....................... | 285/420 |
| 5,842,725 A | * | 12/1998 | Allert .................... | 285/114 |
| 6,413,006 B1 | * | 7/2002 | Neugart ................... | 403/344 |
| 6,896,438 B1 | * | 5/2005 | Chen ...................... | 403/290 |
| 7,448,297 B2 | * | 11/2008 | Tiong ..................... | 74/551.8 |
| 2005/0099001 A1 | * | 5/2005 | Cassel et al. ............. | 285/23 |

* cited by examiner

*Primary Examiner*—James M Hewitt
(74) *Attorney, Agent, or Firm*—Gifford, Krass, Sprinkle, Anderson & Citkowski, P.C.

(57) ABSTRACT

A clamp for clamping a cylindrically shaped structure within a hollow cylindrical structure includes means to maintain the angular and axial position of the structures fixed while the clamp is tightened.

4 Claims, 1 Drawing Sheet

CLAMP

CROSS-REFERENCE TO RELATED APPLICATIONS

This application claims priority of U.S. Provisional Patent Application Ser. No. 60/983,277, filed Oct. 29, 2007, which is incorporated herein by reference.

BACKGROUND OF THE INVENTION

A clamp can be defined as a tool for holding one or more components firmly in place. As such, clamps are used for a multitude of applications in various industries. For example, hose clamps can be used for attaching one cylindrically shaped object, e.g. a hose, onto another cylindrically shaped object, e.g. a hose fitting or nib. The tightening of the hose clamp is typically afforded by a screw thread pattern within a band of the clamp and a captive screw turning and interacting with the thread pattern.

Another example of a clamp designed to attach one cylindrical shaped component to another cylindrical shaped component includes a hollow tube with internal diameter threads to be tightened onto a threaded shaft. The hollow tube typically has an axially oriented slot at the threaded end, the slot extending radically through the wall of the tube. The slot provides for relatively easy turning of the tube onto the threaded shaft until a desired position between the two is reached. The slot also allows for the hollow tube sidewall to be tightened upon and collapse onto the threaded shaft.

Heretofore clamps have not allowed a user to manipulate the hollow tube with internal diameter threads on the threaded shaft and simultaneously maintain the clamp in a fixed radial or angular position. As such, each time an adjustment is made between the hollow tube and the shaft, the clamp has to be realigned before tightening. Therefore, there is a need for an improved clamp that can tighten around a hollow cylindrical shaped structure placed over a smaller cylindrical shaped structure while maintaining the cylindrical shaped structures in a fixed angular relationship.

DETAILED DESCRIPTION OF THE PREFERRED EMBODIMENTS

An improved clamp for tightening a hollow cylindrical shaped structure onto a smaller cylindrical shaped structure is provided. In particular, a clamp for fixedly attaching a tube with internal diameter threads onto a shaft with outer diameter threads is provided. As such, the component of the present invention has utility as a clamp.

Figure 1:
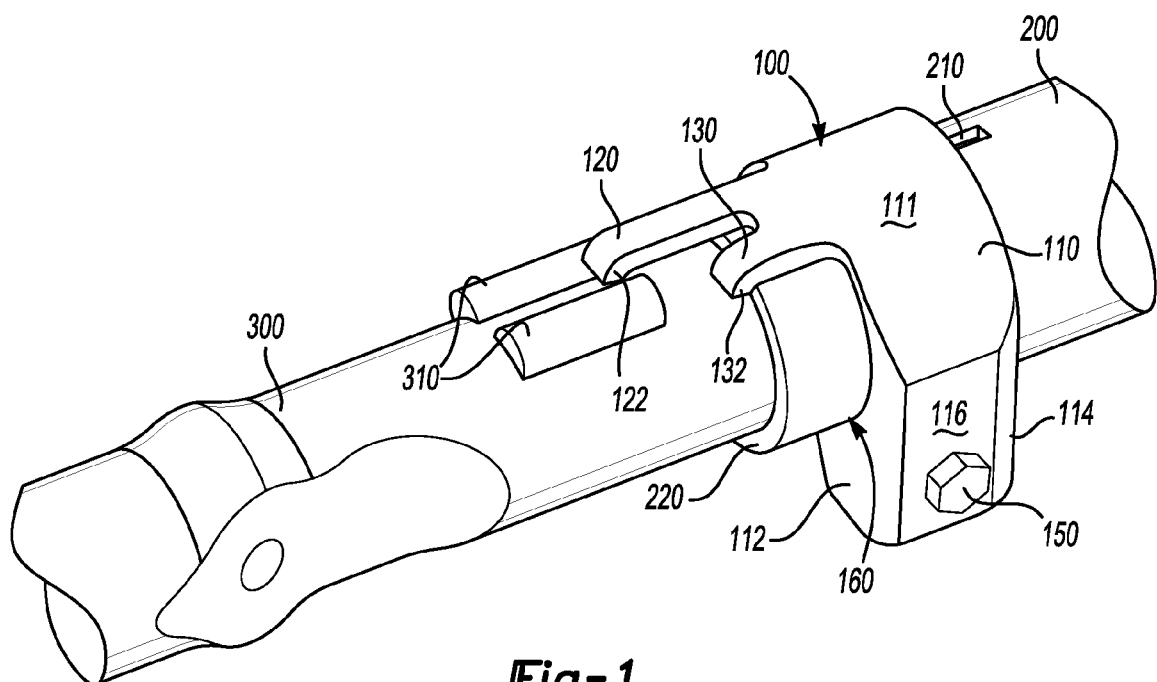
FIG. 1 is a perspective view of the clamp of the present invention.
Figure 2:
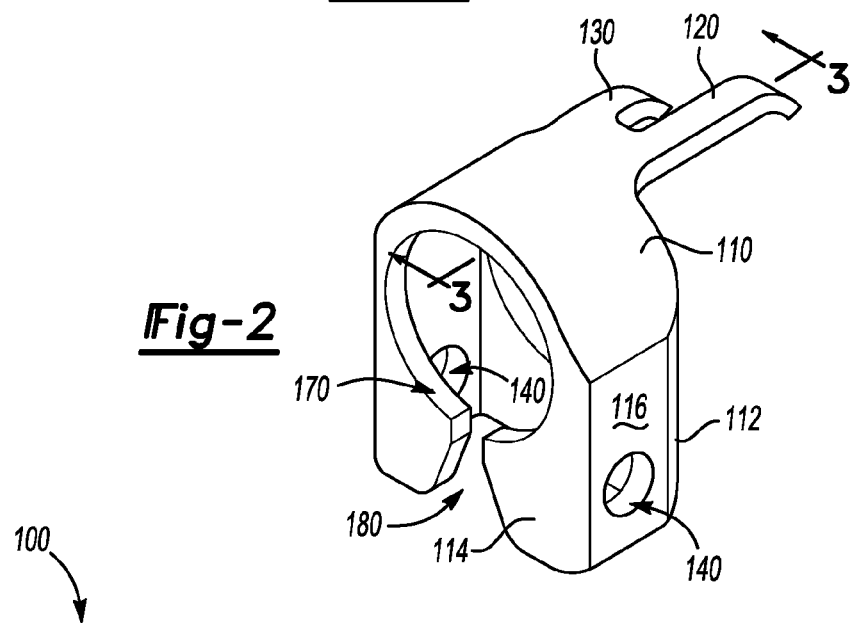
FIG. 2 is a perspective view of a portion of the clamp as shown in FIG. 1.
Figure 3:
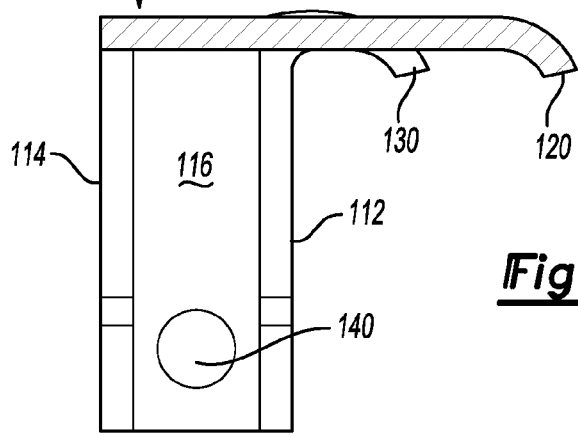
FIG. 3 is a cross sectional view as seen from line 3-3 of FIG. 2.

Turning to FIGS. 1-3, an embodiment of the present invention is shown wherein a clamp 100 is used to clamp a hollow tube 200 onto a rod 300. The clamp 100 includes a housing 110. The housing 110 has a top surface 111 with a first tab 120 and a second tab 130 extending therefrom. The housing 110 also has a front surface 112, a rear surface 114 oppositely disposed from the front surface 112, and at least two side surfaces 116. The side surfaces 116 adjoin the front surface 112 to the rear surface 114 and all of the surfaces 112, 114 and 116 extend from the top surface 111 such that a housing 110 permits the hollow tube 200 to fit within housing 110 as shown in FIGS. 1 and 2 is provided. The side surfaces 116 can include an aperture 140 which affords for a bolt 150 to extend therethrough. A nut (not shown) can be screwed onto the bolt 150 and thereby apply a force to pull the side surfaces 116 in an inward direction.

A hollow tube 200 having an axially oriented slot 210 can be located within an aperture 170 of the clamp 100. In an example of the present embodiment, the clamp 100 has a pair of apertures 170. The tube 200 affords for a cylindrically shaped structure 300 to fit within. In an example of the use of the present invention, the tube 200 can have threads on the internal diameter (not shown) which afford for the screwing of the tube 200 onto threads (not shown) on the end of the cylindrical structure 300 that is inserted within the hollow tube 200. In another example of the use of the present invention, the cylindrical structure 300 is a tie rod and the tube 200 is an adjuster tube. In yet another example of the use of the present invention, the cylindrical structure 300 is a tie rod for an automobile steering system and the tube 200 is an adjuster tube associated with the linkage assembly of the steering system of the automobile.

The clamp 100 of the present invention affords for the hollow tube 200 to slide therethrough via the aperture 170. The second tab 130 has a lip 132 (FIG. 1) and extends from the top surface 111. The length of the second tab 130 and the lip 132 afford a specific distance as shown at 160 between a tube end 220 and the front face 112 of the clamp 100. In addition, tab blocks 310 on the cylindrical structure 300 afford for the first tab 120 with a lip 122 to slide or fit therebetween. With the first tab 120 located between the tab blocks 310, the hollow tube 200 can be rotated within the housing 110 about the cylindrical structure 300 while the clamp 100 remains in a fixed radial or angular position with respect to the cylindrical structure 300. After the desired position of the hollow tube 200 is obtained with respect to the cylindrical structure 300, the clamp 100 can be tightened, for example using the bolt 150 and a nut (not shown). The slot region 180 of the clamp 100 affords for the surface bounding the aperture 170 to tighten around the hollow tube 200. The axially oriented slot 210 within the tube 200 permits the tube 200 to be collapsed to grip the cylindrical structure 300 upon tightening the clamp 100. In this manner, a clamp that affords for the adjustment of a linkage assembly while the clamp remains in a fixed radial position is provided.

It is appreciated that the present invention can be used to aid in the rotation of an adjuster tube to set the correct length of a linkage assembly of a steering system. In so doing, the clamp of the present invention maintains the same relative angular position with respect to a tie rod, as well as remaining fully engaged with the adjuster tube. The long tab sets the relative angular position of the clamp with respect to the tie rod and the short tab provides a positive stop to set the clamp depth along the adjuster tube. Tab blocks on the tie rod can be formed using any method known to those skilled in the art, illustratively including machining the blocks onto the rod, welding the blocks onto the rod, placing the blocks on the rod using adhesives, and the like. It is appreciated that the clamp of the present invention can be made of any material known to those skilled in the art, illustratively including metals, alloys, and plastics. Although a bolt and a nut are shown to be the mechanism by which the clamp is tightened upon the hollow tube, other means for tightening the clamp can be used, such as springs, latch mechanisms, and the like.

The invention is not restricted to the illustrated examples described above. The examples are not intended as limitations on the scope of the invention. Methods, apparatus, and the like described herein are exemplary and not intended as limitations on the scope of the invention. Changes therein and other uses will occur will to those skilled in the art. The scope of the invention is defined by the scope of the claims.

I claim:

1. A clamp assembly comprising an outer tube, an inner cylindrical structure and a clamp for securing an end of said outer tube to an end of said inner cylindrical structure, said clamp comprising a housing having an aperture, said aperture dimensioned to permit said outer tube to slide therethrough to position said clamp over said end of said outer tube;

said end of said inner cylindrical structure axially received within said end of said outer tube and being axially and rotatably movable within said outer tube;

said inner structural member having a pair of arcuately spaced axially elongated projections on said inner structural member spaced from said end thereof;

said housing of said clamp having a first elongated tab and a second shorter elongated tab arcuately spaced from each other and each extending axially away from said end of said outer tube and toward said inner cylindrical structure;

said first elongated tab engaging said end of said outer tube to axially position said clamp on said outer tube; and said second elongated tab being positioned within the space between said projections on said inner structural member to permit said inner structural member and said outer tube to move axially together and apart while maintaining the radial position of said clamp housing.

2. The assembly as defined n claim 1 and in which said second tab has a lip which extends inwardly from said tab into engagement with said end of said outer tube.

3. The assembly as defined in claim 1 and in which said first tab has a lip which extends inwardly to a position within the space between said projections on said inner structural member.

4. The assembly as defined in claim 1 and in which said clamp includes means for radially tightening said outer tube into engagement with said end of said inner cylindrical structure.

* * * * *